United States Patent [19]

Dutilloeil

[11] 3,852,618

[45] Dec. 3, 1974

[54] THYRISTOR INITIATING DEVICE FOR HIGH VOLTAGE D.C. LINE

[75] Inventor: Jacques Dutilloeil, Mont-Sur-Marchienne, Belgium

[73] Assignee: Acec (Ateliers de Constructions Electriques de Charleroi, Charleroi, Belgium

[22] Filed: June 25, 1973

[21] Appl. No.: 373,485

[30] Foreign Application Priority Data
June 28, 1972 Belgium .................................. 4156

[52] U.S. Cl. ......... 307/252 Q, 307/252 L, 307/311, 321/27 R
[51] Int. Cl. ............................................ H02m 1/08
[58] Field of Search ............ 307/252 L, 252 A, 311, 307/252 Q, 305; 321/27 R, 11; 328/2

[56] References Cited
UNITED STATES PATENTS

| | | |
|---|---|---|
| 3,355,600 | 11/1967 | Mapham ........................ 307/252 L |
| 3,386,027 | 5/1968 | Kilgore et al. ..................... 321/27 R |
| 3,593,038 | 7/1971 | Cavallius et al. ................. 307/252 L |
| 3,628,035 | 12/1971 | Olsson et al. ....................... 307/311 |
| 3,723,768 | 3/1973 | Eccles et al. ....................... 307/311 |
| 3,729,670 | 4/1973 | Dewey .................................. 321/11 |

Primary Examiner—William H. Beha, Jr.
Attorney, Agent, or Firm—Raymond A. Robic; Arthur Schwartz; David A. Blumenthal

[57] ABSTRACT

A converting circuit adapted to be used at each end of a high voltage direct current transmission line. The circuit comprises a plurality of power thyristors connected in series, a resistor shunts each thyristor, a rectifying bridge made up of diodes is connected at the terminals of each thyristor for charging capacitive means when the thyristor is not conducting. The energy stored in the capacitive means initiates the thyristors through opto-electronic elements of a low power in response to radiant energy.

5 Claims, 2 Drawing Figures

THYRISTOR INITIATING DEVICE FOR HIGH VOLTAGE D.C. LINE

The present invention relates, in particular, to the transport of direct current high voltage power along a line extending over a long distance. The use of direct current instead of alternating current along a power line is advantageously known. To provide a bidirectional exchange of energy, a converter susceptible to operate as a rectifier or as an inverter is provided at both ends of the power line. Such a converter is presently equipped with thyristors among which a large number of them are connected in series because of the very high voltage of the line each of these thyristors being shunted by a voltage distribution resistor.

One of the problems encountered with such prior art device resides in the difficulty of controlling the simultaneous firing of the thyristors connected in series in each branch of the converter. A typical solution is in utilizing a common source and in distributing the control pulses to the thyristors by means of transformers. This technique because of the insulation problems involved, requires a large number of transformers.

It has been also proposed to use power phototransistors, the firing of which is caused by radiant energy distributed for instance, by means of optical fibers. This arrangement proves to be very simple and reliable and does away with the insulation problems. However, besides the fact that power photothyristors are expensive and that they do not permit the delivery of sufficient powers, as yet, the efficiency with which the radiant energy is transmitted to each of them, particularly with optical fibers, is undoubtably too low, thereby requiring considerable power from the source.

It has also been advocated to control power thyristors by pairs by means of an auxiliary source through an amplifier and insulating transformers. This arrangement enables one to reduce the control light power but, on the other hand, it is intricate, involves with insulation problems and introduces delays in the conduction of thyristors.

The device in accordance with the present invention simply and economically solves the above-mentioned problems. This device comprises, in each branch of an inverter, ordinary power thyristors connected in series, each of these thyristors being shunted, in known manner, by a voltage distributing resistor and is characterized in that a diode rectifying bridge is connected at the terminal of each of these thyristors for charging a capacitor or a group of capacitors during the nonconducting periods of a thyristor. The energy stored in this or these capacitors is used to initiate said thyristor by means of a circuit including opto-electronic elements of low power which are initiated by a suitable radiant energy.

The hereinafter description and the accompanying drawings refer to preferred embodiments of the device in accordance with the instant invention.

Figure 1:
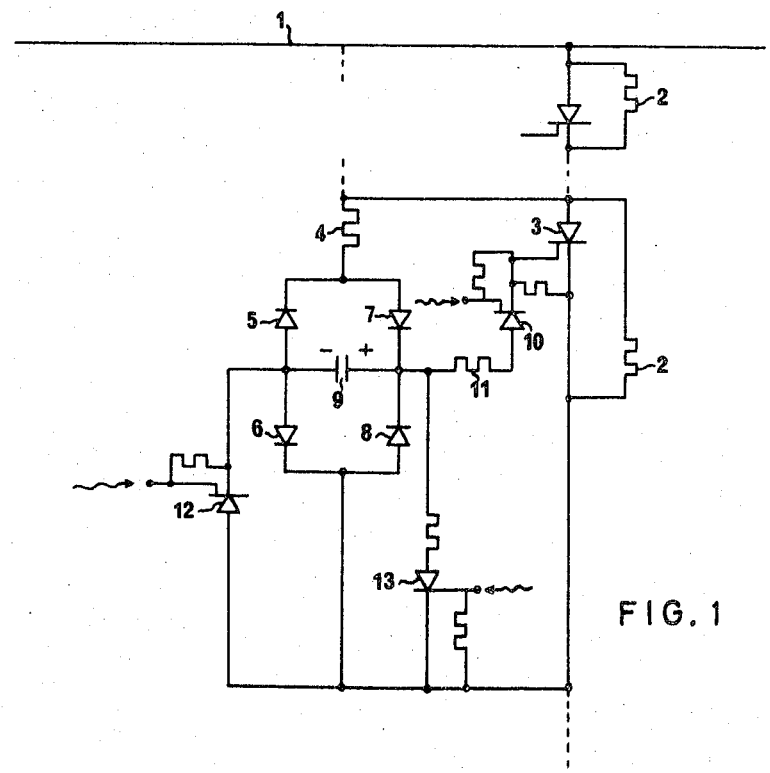
FIG. 1 shows a branch of power thyristors connected in series and to a direct current high voltage transmission line.

Referring to FIG. 1, there are illustrated a number of thyristors shunted by resistors 2 of equal value able to distribute uniformly the branch voltage to the terminals of each of the thyristors.

Each of the thyristors is associated with a circuit such as the one illustrated in the figures for thyristor 3. This circuit comprises, connected in parallel with thyristor 3, through resistor 4, a rectifying bridge made up of four diodes 5, 6, 7 and 8 feeding capacitor 9. This capacitor is charged with the peak voltage of thyristor 3 when the latter is not conducting and thereby contains a potential energy supplied by line 1, at a constant level, which energy will be used to initiate thyristor 3 as hereinafter explained.

The gate and the cathode of thyristor 3 are respectively connected to the capacitor 9 through a photothyristor 10 in series with a resistor 11 and another photothyristor 12. These two photothyristors are of low power and only low radiant energy is required to initiate them. It is easily seen that the simultaneous initiating of both photothyristors 10 and 12 causes the discharge of capacitor 9 into the gate-cathode circuit of the power thyristor 3 which thereby undergoes conduction. This process is obviously identical and simultaneous for all the thyristors in the branch under concern.

In the circuit shown in FIG. 1, there is provided a third photothyristor 13, also of low power which is susceptible to stop at a predetermined time the discharge of capacitor 9 into the gate-cathode circuit of thyristor 3; thus, it is possible to control the lasting time of the initiating pulse which is adapted to the characteristics of thyristor 3 as indicated by the manufacturer.

Therefore, the above-described device is very simple and does not require special insulation since the initiating energy for each power thyristor is taken at the terminals thereof. This device does not also require high control power, this control being made through substantially low power photothyristors.

Figure 2:
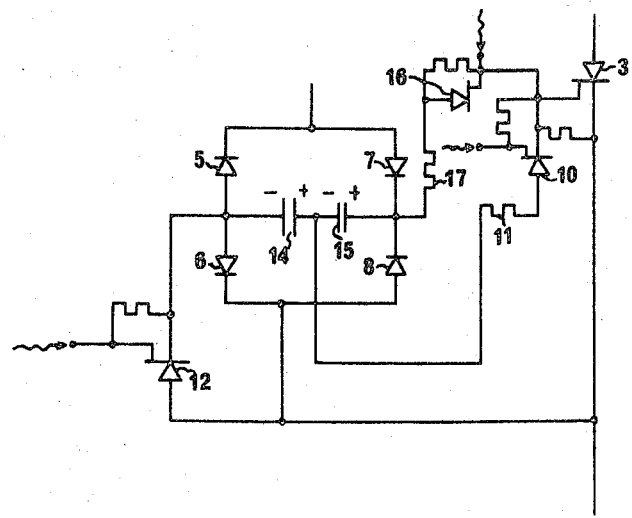
FIG. 2 depicts another embodiment of the device shown in FIG. 1.

To lower the cost of capacitor 9 which has to be of high capacitance and to hold up a high voltage, and the energy of which is almost wholy dissipated in resistor 11, the embodiment of FIG. 2 may be adopted wherein the corresponding elements shown in FIG. 1 are indicated by like numerical references. According to this embodiment, the capacitor 9 is replaced by two capacitors 14 and 15 in series, capacitor 14 being of a capacitance substantially higher than that of capacitor 15 and, consequently, having a lower voltage at the terminals thereof. The circuit further comprises a photothyristor 16 connected in series with a resistor 17, the latter photothyristor being energized at the same time than the other thyristors. Resistor 11 is of a very low value and resistor 17 of a very high value. When the power thyristor 3 is initiated, the capacitor 14, because of the low value of resistor 11 and in spite of the low voltage between its terminals, delivers a great deal of current through the photothyristor 10 into the gate-cathode circuit of the power thyristor 3, then the amplitude of the current decreases rapidly. At the same time the capacitor 15, owing to the high value of the resistor 17, is discharged through the photothyristor 16 by providing a low current of a high time constant. This current is added in the gate-cathode circuit of thyristor 3 to the one delivered by capacitor 14. Consequently, there is obtained in this latter circuit a current which raises sharply at the beginning and which decreases slowly thereafter with a low amplitude, which is desirable. Consequently, the energy dissipated in the resistors is lower and the cost of the two capacitors 14 and 15 is lower than that of capacitor 9 shown in FIG. 1.

If photothyristors able to sustain high voltage are not available, they may be replaced by common thyristors controlled by photothyristors so that low power may be used to activate the latters.

It is obvious, in the above-described embodiments, to replace the photothyristors by opto-electronic elements such as photodiodes or phototransistors.

It is also obvious to use the present invention not only for high voltage converters but also for initiating any single thyristor regardless of its utility voltage.

It is to be understood that various modifications may be made thereto within the ambit of the present invention.

I claim:

1. A converting circuit comprising:
   a. a plurality of series connected thyristors, each thyristor having a cathode, an anode and a gate, and each thyristor connected in a control circuit comprising:
   b. resistive means connected for shunting said thyristor,
   c. rectifying bridge means connected to the cathode and anode of said thyristor,
   d. capacitive means connected to said bridge circuit for triggering said thyristor,
   e. a first optically controlled switching element connected between one side of said capacitive means and the gate of said thyristor,
   f. a second optically controlled switching element connected to the other side of said capacitive means and to the cathode of said thyristor, and
   g. means for simultaneously activating said first and second optically controlled switching elements, whereby said capacitive means is charged when said thyristor is non-conducting and discharged through said first and second optically controlled switching elements for triggering said thyristor.

2. A converting circuit as recited in claim 1 further comprising a third optically controlled switching element in said control circuit connected between said one side of said capacitive means and the cathode of said thyristor for terminating the discharge of said capacitive means.

3. A circuit as claimed in claim 1, wherein said optically controlled switching elements are photothyristors.

4. A circuit as claimed in claim 1, wherein said optically controlled switching elements include thyristors controlled by photothyristors.

5. A circuit as claimed in claim 1, wherein said capacitive means include two capacitors connected in series, one of said capacitors being of a greater value than the other, said capacitors being simultaneously discharged into the gate-cathode circuit of said thyristor to be controlled.

* * * * *